(12) United States Patent
Vonk et al.

(10) Patent No.: US 8,784,165 B2
(45) Date of Patent: Jul. 22, 2014

(54) RESIDUAL FAT REMOVER AND METHOD FOR REMOVING RESIDUAL FAT OF POULTRY FILLETS

(71) Applicant: Meyn Food Processing Technology B.V., Oostzaan (NL)

(72) Inventors: Pieter Willem Vonk, Oostzaan (NL); Ferdinand Allard De Vos, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 13/912,460

(22) Filed: Jun. 7, 2013

(65) Prior Publication Data
US 2013/0331017 A1 Dec. 12, 2013

(30) Foreign Application Priority Data
Jun. 7, 2012 (NL) .................................. 2008956

(51) Int. Cl.
*B24B 5/00* (2006.01)
(52) U.S. Cl.
USPC ........................................................ 452/135
(58) Field of Classification Search
USPC ........... 452/125, 127–130, 54, 153–155, 165, 452/187–189, 166–169, 185, 170
See application file for complete search history.

(56) References Cited

U.S. PATENT DOCUMENTS

| | | | | |
|---|---|---|---|---|
| 4,748,721 A | * | 6/1988 | Braeger | 452/127 |
| 4,993,114 A | | 2/1991 | Meyer et al. | |
| 5,476,417 A | * | 12/1995 | Long et al. | 452/127 |
| 6,322,437 B1 | * | 11/2001 | Grabau et al. | 452/161 |
| 6,322,438 B1 | * | 11/2001 | Barendregt et al. | 452/167 |
| 7,344,437 B2 | * | 3/2008 | Van Den Nieuwelaar et al. | 452/187 |
| 7,614,941 B2 | * | 11/2009 | van den Nieuwelaar et al. | 452/185 |
| 8,485,870 B2 | * | 7/2013 | Janssen et al. | 452/136 |

FOREIGN PATENT DOCUMENTS

| | | |
|---|---|---|
| EP | 0168865 A1 | 1/1986 |
| EP | 0380714 A1 | 8/1990 |

OTHER PUBLICATIONS

PCT International Search Report for NL 2008956, Dated Oct. 13, 2012.

* cited by examiner

Primary Examiner — Richard Price, Jr.
(74) Attorney, Agent, or Firm — Dority & Manning, P.A.

(57) ABSTRACT

A residual fat remover and method for removal of residual fat that remains on tissue of a poultry carcass after the poultry carcass has passed a scraper for releasing tissue connections between a fillet or fillets and the poultry carcass, wherein the fillet or fillets still at least in part are attached to the carcass when passing the residual fat remover, and wherein the residual fat remover is embodied with opposite pens that are positioned along the path of the passing poultry carcass on opposite sides of the breastbone of the passing poultry carcass so as to detach the residual fat on the outer sides of the fillet or fillets during passing of the poultry carcass.

12 Claims, 7 Drawing Sheets

RESIDUAL FAT REMOVER AND METHOD FOR REMOVING RESIDUAL FAT OF POULTRY FILLETS

FIELD OF THE INVENTION

The invention relates to a residual fat remover and a method for removing residual fat that remains on tissue of a poultry carcass after the poultry carcass has passed a scraper for releasing tissue connections between a fillet or fillets and the poultry carcass, wherein the fillet or fillets still at least in part attach to the carcass when passing the residual fat remover.

SUMMARY OF THE INVENTION

Aspects and advantages of the invention will be set forth in part in the following description, or may be obvious from the description, or may be learned through practice of the invention.

It is known in the art to apply a scraper in a method for releasing tissue connections between a fillet or fillets and a carcass of slaughtered poultry. Such a method and scraper are known from day to day practice in the field of poultry processing and are used in high-speed processing lines for harvesting high-quality fillets from poultry carcasses on industrial scale.

To date the quality requirements of fillets are ever increasing resulting amongst others in the need to provide fillets free of any fatty tissue still attaching to the fillets. This imposes a heavy challenge on designers and developers of machinery for automated harvesting of fillets, since the removal of fatty tissue has so far proven that it can hardly be automated. Even when special scrapers are used that are designed to remove the fatty tissue to the largest possible extent, in many cases there still remains fatty tissue on the sides of the fillets and on the lower back portion of the fillets.

It is therefore a first object of the invention to provide a method and apparatus capable to harvest fillets of poultry of the highest feasible quality.

It is a further object of the invention to provide a method and apparatus by which remaining fat still attaching to the fillets can be removed.

It is still a further object of the invention to automate to the largest possible extent the harvesting of fillets such that they are substantially free of attaching fatty tissue.

In connection with the previous object, it is an object of the invention to save on manual labour which would otherwise be required for providing fillets that are substantially free of attaching fatty tissue.

These and other objects and advantages are promoted by using a residual fat remover and method for removal of residual fat according to one or more of the appended claims.

BACKGROUND OF THE INVENTION

According to a first aspect of the invention the residual fat remover is embodied with opposite pens that are positioned along the path of the passing poultry carcass on opposite sides of the passing poultry carcass so as to detach the residual fat of the fillet or fillets during passing of the poultry carcass. This residual fat is the residual side fat on the sides of the fillets and/or the residual point fat which is located at the back end of the fillets. It is further noted that normally the residual fat remover is positioned stationary along a processing line in which the poultry carcasses are conveyed. It is within the scope of the invention and the appended claims however also possible to apply stationary poultry carcasses and to move the residual fat remover along these poultry carcasses. In that case one can still relate to stationary poultry carcasses as being passing poultry carcasses since the poultry carcasses and the fat remover then still pass each other.

The pens preferably have rounded extremities to prevent them damaging the fillet or fillets while scraping along said fillet or fillets for the removal of the residual side fat.

In order to provide the largest effectivity in the removal of all residual fat it is preferred that the passing poultry carcass is arranged to move past the opposite pens with the poultry carcass passing with its back, where the fillet's point fat is located, being the trailing part of the carcass. It is found that this orientation is most effective in the removal of both the residual side fat and the residual point fat.

Further it is preferred that the opposite pens have sharp edges pointing in a direction opposite to the movement of the poultry carcass. Such sharp edges ensure an uninterrupted progressing of the poultry carcass, in a way that any remaining tissue connections encountered by the pens will then not adversely affect the orientation of the poultry carcass while the carcass moves passed the opposite pens of the residual fat remover. This measure thus also increases the efficiency of the pens.

It has been found beneficial for the effective removal of residual fat, particularly at the trailing back end of the poultry carcass, that the opposite pens are arranged to move towards each other upon the poultry carcass progressing in its movement passed the opposite pens of the residual fat remover. In this way the two movements of the poultry carcass and the opposite pens strengthen each other in their operational efficiency, particularly for removal of the point fat. This can suitably be arranged by making the movement of the opposite pens dependent on and caused by the carrier for the poultry carcass.

The accuracy of the residual fat remover of the invention is further promoted when in operation the poultry carcass moves along guides that are then positioned in the natural position between the carcass and the fillets on the carcass to give way to where the pens of the residual fat remover are intended to be eventually positioned.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The invention will hereinafter be further elucidated with reference to a drawing of an exemplary embodiment of the scraper and its use in accordance with the invention.

A full and enabling disclosure of the present invention, including the best mode thereof, directed to one of ordinary skill in the art, is set forth in the specification, which makes reference to the appended figures, in which:

In the drawing:

FIG. 1 shows in a frontal view fillets that have been subjected to a scraping operation, and are immediately in front a residual fat remover according to the invention;

Figure 1:
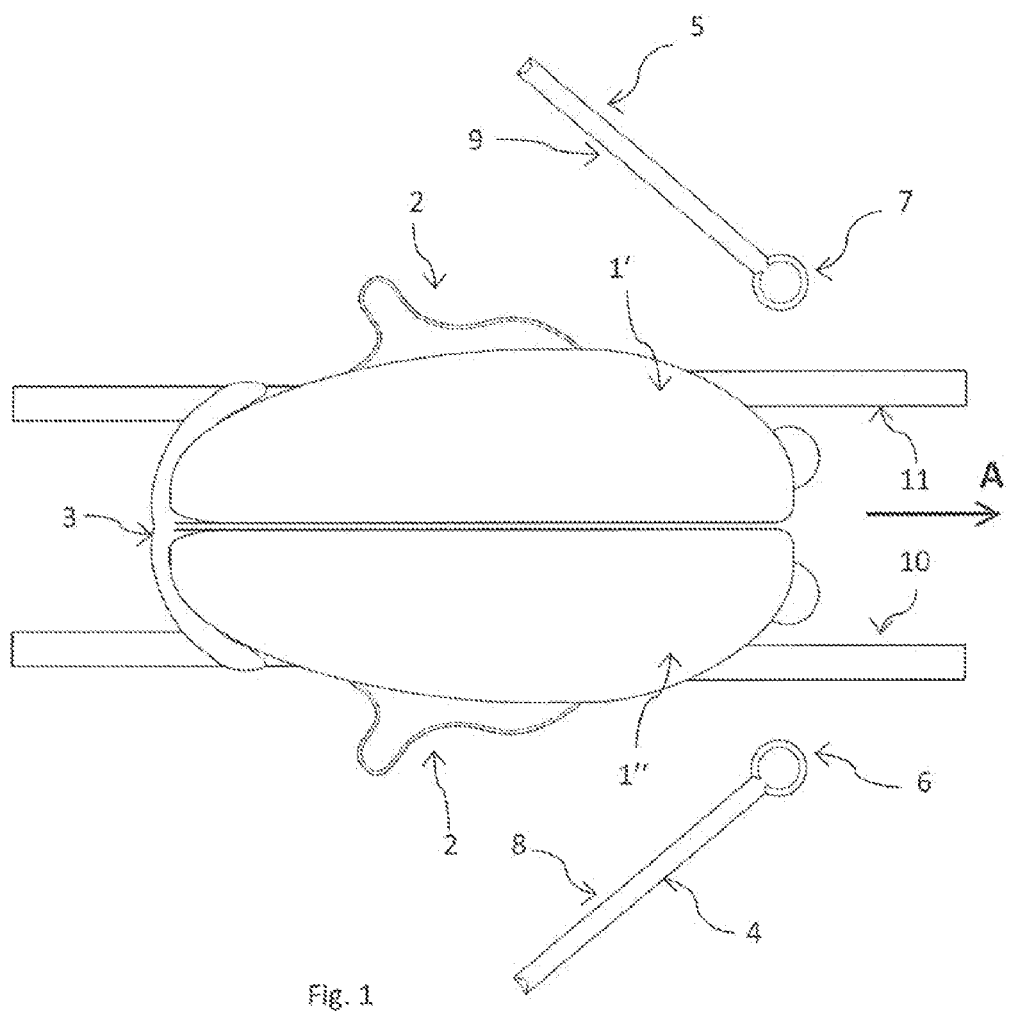
Figure 2:
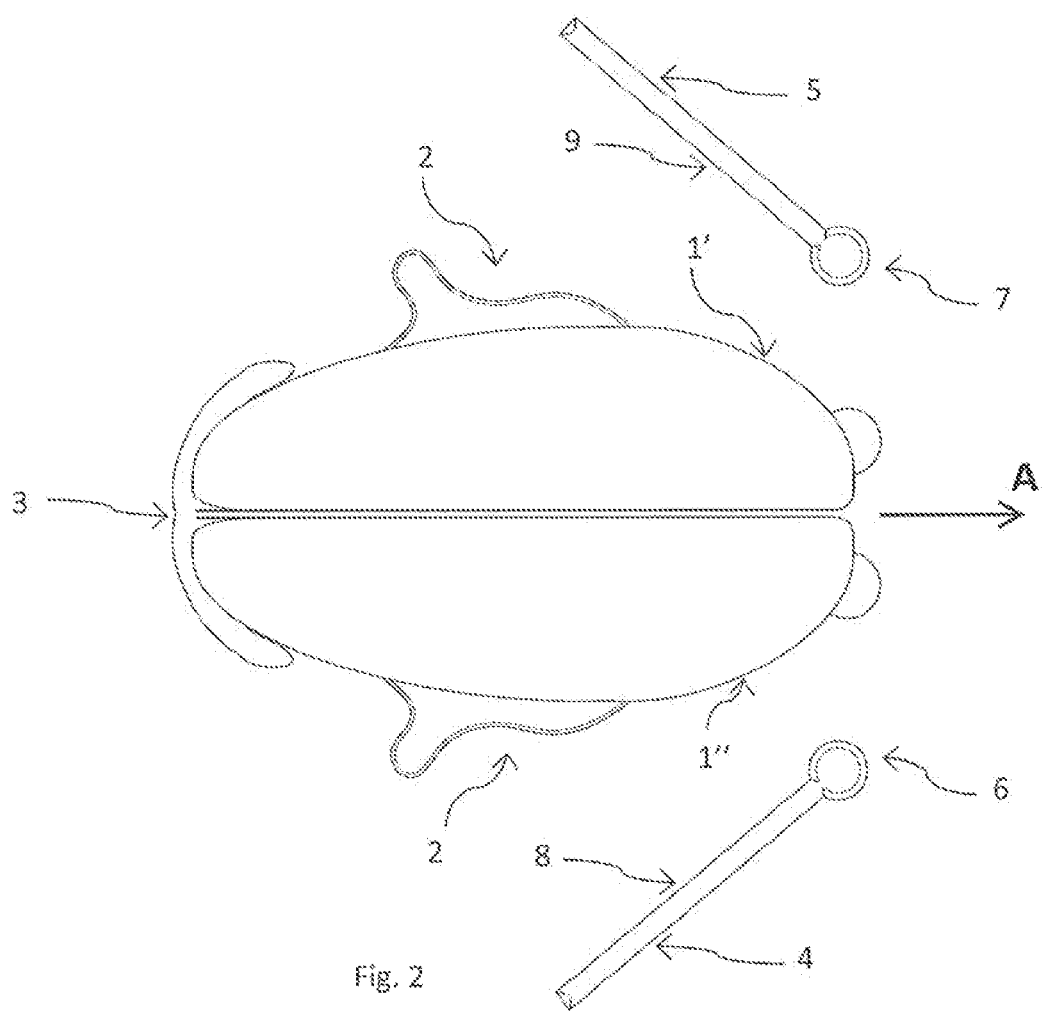
Figure 6:
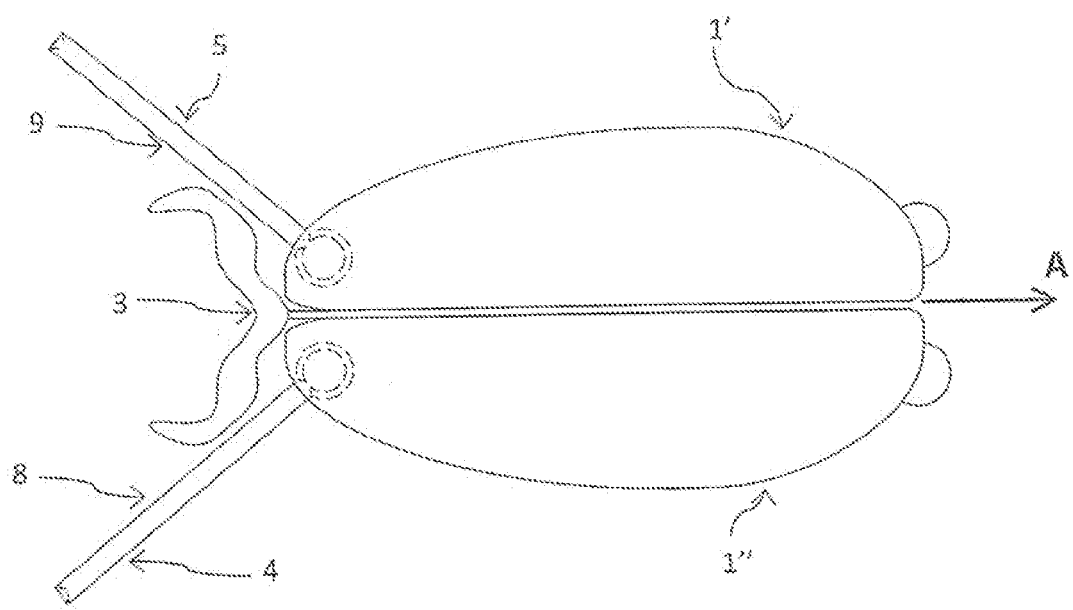
Figure 7:
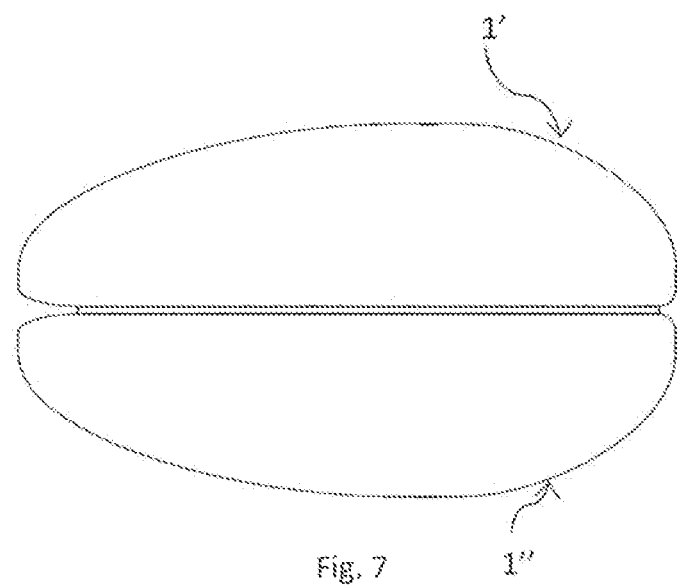

FIG. 2 corresponds to FIG. 1 leaving out the details that are not required for understanding the invention;

FIGS. 3-6 show subsequent procedural steps in the operation of the residual fat remover; and FIG. 7 shows the fillets after completion of the processing by the residual fat remover.

Wherever in the figures the same reference numerals are applied, these numerals refer to the same parts.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

With reference first to FIG. 1 a frontal view is provided of the fillets 1' and 1" that are located on the poultry carcass supporting the fillets that are being processed. This poultry carcass has prior to the processing according to the invention been subjected to a scraping operation which is known as such from the prior art. The scraping action provides that the majority of the tissue connections between the fillets 1' and 1" and the poultry carcass are broken with the exception of some connections with the carcass that still hold the fillets 1', 1" in position. With the conventional scraping operation inevitably some side fat 2 and so-called point fat 3 at the trailing end of the poultry carcass remains attached to the fillets 1' and 1". The invention is concerned with removal of this side fat 2 and/or point fat 3.

According to the invention the poultry carcass with the fillets 1' and 1" partly attached thereto is moved passed a residual fat remover, which essentially is made up of opposite pens 4, 5 that are positioned along the path of the passing poultry carcass. This path is symbolized with arrow A. As is clear from this FIG. 1 and the other figures the passing poultry carcass is arranged to move past the opposite pens 4, 5 with the poultry carcass passing with its back (where the point fat 3 is located) being trailing. FIG. 1 also shows that the poultry carcass moves along guides 10, 11 that are placed in the natural position between the carcass and the fillets 1', 1" on the carcass. The guides 10, 11 assist the introduction of the opposite pens 4, 5 between the fillets 1', 1" and the carcass underneath the fillets.

Figure 3:
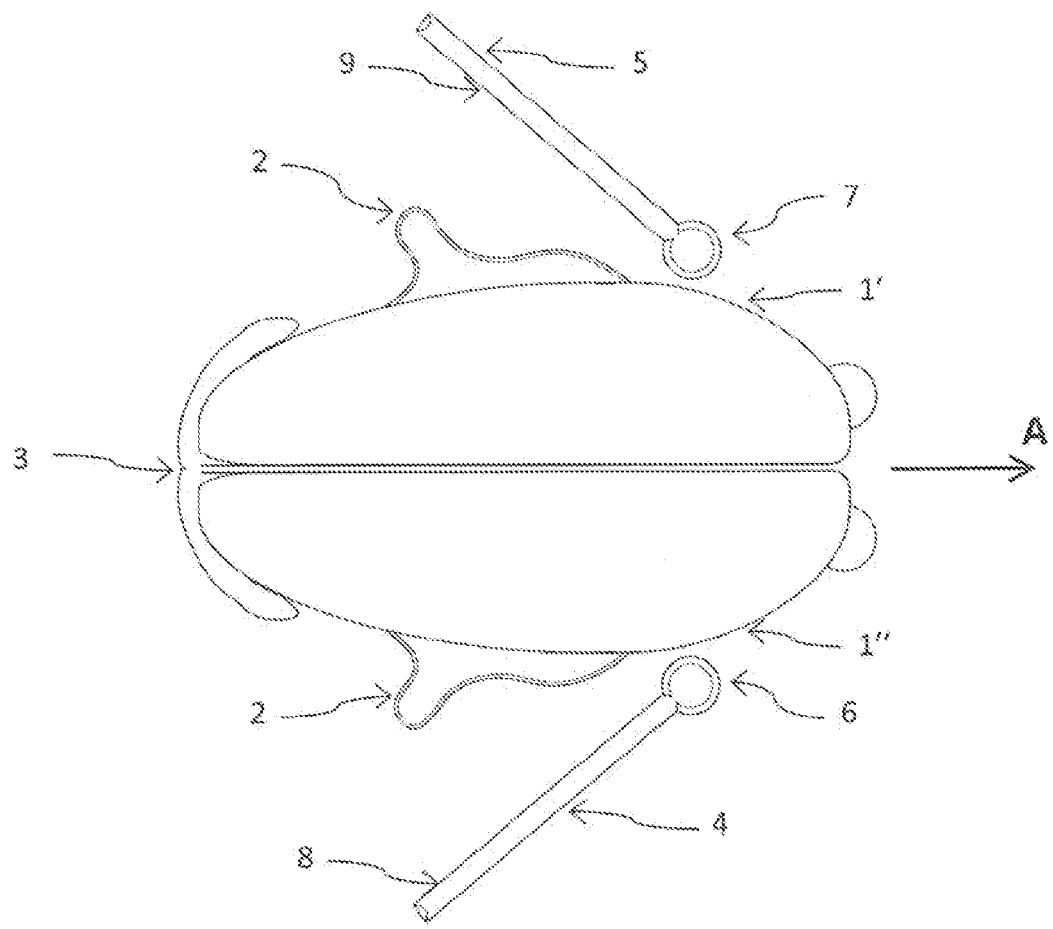

The pens 4, 5 are positioned on opposite sides of the breastbone of the passing poultry carcass at a suitable position at the outer side of the fillets 1', 1" to initiate the detachment of the residual fat 2 on the said outer sides of the fillets 1' and 1" during passing of the poultry carcass. This is best shown in FIG. 3. FIG. 3 shows that the opposite pens 4, 5 have rounded extremities 6, 7 that are operational for the removal of the side fat 2, and which further have the purpose to prevent damage to the meat of the fillets during their scraping against the fillets 1', 1" on the poultry carcass. During the movement of the poultry carcass with the pens 4, 5 in the position shown in FIG. 3, side fat 2 is removed from the sides of the fillets 1', 1".

Figure 4:
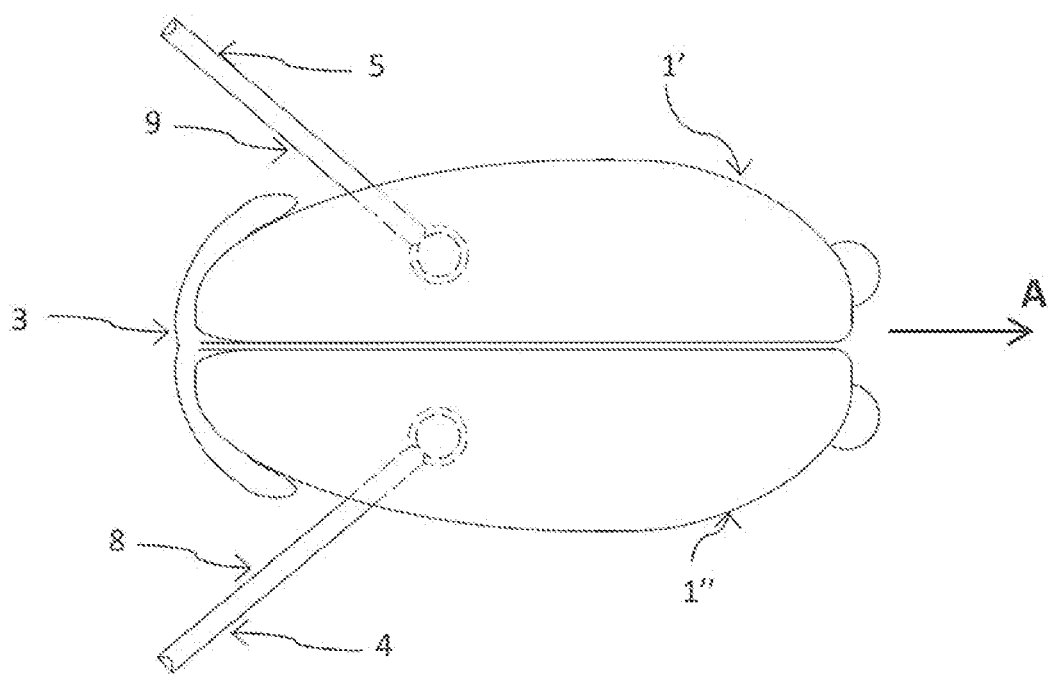
Figure 5:
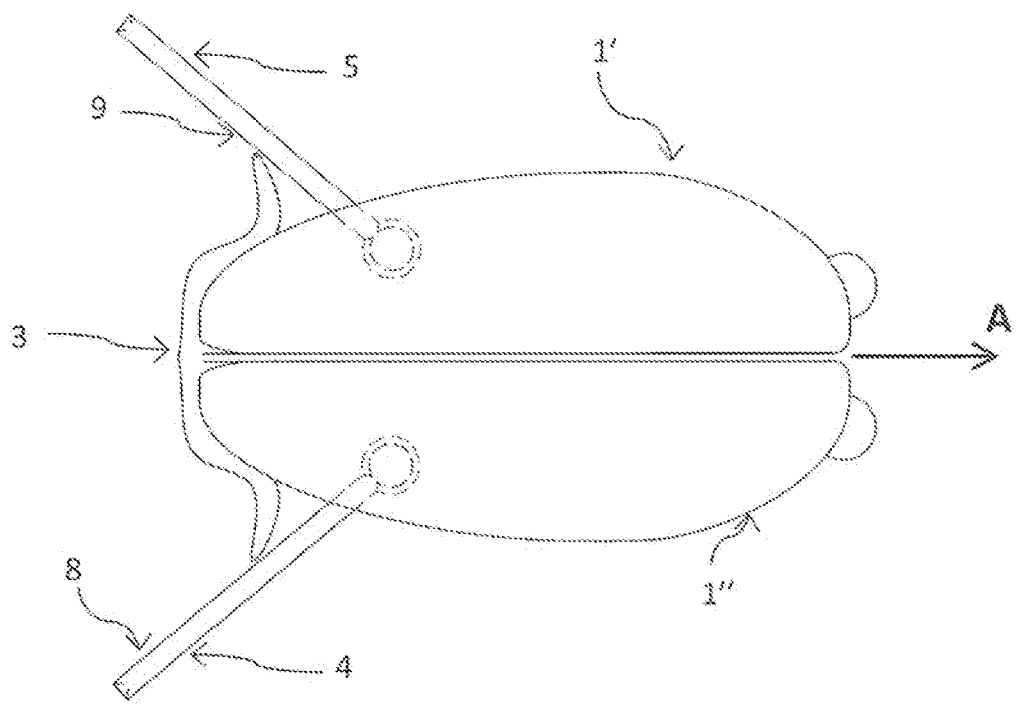

With the further progressing of the poultry carcass in the direction of the arrow A as imaged in FIG. 4, the opposite pens 4, 5 are arranged to move towards each other and thus move between the fillets 1', 1" and the not visible bones of the poultry carcass. In case there would be any tissue connections remaining between the fillets 1', 1" and the poultry carcass, the opposite pens 4, 5 are provided with sharp edges 8, 9 pointing in a direction opposite to the movement direction A of the poultry carcass. This effectively ensures that such tissue connections do not hinder the progressing of the poultry carcass passed the opposite pens 4, 5 of the residual fat remover. The movement of the opposite pens 4, 5 continues until they closely approach the breastbone of the poultry carcass as reflected in FIG. 5, in order to enable that the extremities 6, 7 of the pens 4, 5 reach their closest point approximately upon arrival near to the point fat 3. FIG. 6 shows that with the further progressing of the poultry carcass along arrow A the said point fat 3 is then effectively torn loose from the fillets 1', 1". FIG. 7 shows the clean fillets 1', 1" without any remaining residual fat tissue.

For the avoidance of doubt it is remarked that the above elucidation with reference to the appended drawing is not to be considered restrictive as to the appended claims. Within the scope of the appended claims it is feasible to embody the residual fat remover of the invention with many variations without departing from the scope of protection of said claims.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A residual fat remover for removal of residual fat that remains on tissue of a poultry carcass, the poultry carcass having a fillet or fillets that are at least partially attached to the carcass when passing the residual fat remover along a conveying path of the poultry carcass, the residual fat remover comprising:

opposite pens that are positioned a distance from each other in an opposing manner along the conveying path of the poultry carcass, the pens also positioned on opposite sides of the poultry carcass as the poultry carcass passes along the conveying path, the pens configured to move towards each other and the poultry carcass as the poultry carcass passes so as to reduce the distance between the pens, the pens configured to detach the residual fat on the fillet or fillets during passing of the poultry carcass.

2. The residual fat remover as in claim 1, wherein the opposite pens comprise rounded extremities configured to prevent the opposite pens from damaging the fillet or fillets while scraping against the fillet or fillets on the poultry carcass.

3. The residual fat remover as in claim 1, wherein the poultry carcass has a back where point fat is located, and wherein the poultry carcass is arranged to move past the opposite pens so that the poultry carcass passes with its back trailing relative to the direction of movement of the poultry carcass.

4. The residual fat remover as in claim 1, wherein the opposite pens are configured to move between the fillets of the poultry carcass as the poultry carcass moves past the opposite pens.

5. The residual fat remover as in claim 1, wherein the poultry is transported along the conveying path by a carrier, and wherein the movement of the opposite pens towards each other is dependent on and caused by the carrier for the poultry carcass.

6. The residual fat remover as in claim 1, wherein the opposite pens have sharp edges pointing in a direction opposite to the movement direction of the poultry carcass.

7. The residual fat remover as in claim 1, further comprising guides positioned in a natural position between the poultry carcass and the fillet or fillets of the poultry carcass, and wherein the poultry carcass moves along the guides.

8. A method for removal of residual fat remaining on tissue of a poultry carcass after the poultry carcass has passed a scraper for releasing tissue connections between a fillet or fillets and the poultry carcass, wherein the fillet or fillets are still at least in part attached to the poultry carcass when passing the residual fat remover, the method comprising the steps of:
 positioning opposite pens in an opposing manner along a conveying path of poultry carcass and on opposing sides of the conveying path;
 moving the pens to move towards each other so as to reduce the distance between the pens as the poultry carcass passes the pens; and
 detaching residual fat from the fillet or fillets of the poultry carcass as the poultry carcass passes the opposite pens along the conveying path.

9. The method for removal of residual fat remaining on tissue of a poultry carcass as in claim 8, wherein the poultry carcass has a back where point fat is located, and wherein the poultry carcass is arranged to move past the opposite pens so that the poultry carcass passes with its back trailing relative to the direction of movement of the poultry carcass.

10. The method for removal of residual fat remaining on tissue of a poultry carcass as in claim 8, wherein said step of moving the pens is coincident with the passing of a carrier for the poultry carcass.

11. The method for removal of residual fat remaining on tissue of a poultry carcass as in claim 8, further comprising the step of:
 moving the poultry carcass along guides that are positioned in a natural position between the poultry carcass and the fillet or fillets on the poultry carcass.

12. A residual fat remover for removal of residual fat that remains on tissue of a poultry carcass, the poultry carcass having at least one fillet that is at least partially attached to the carcass when passing the residual fat remover along a conveying path of a carrier transporting the poultry carcass, the residual fat remover comprising:
 opposite pens that are positioned in an opposing manner along the conveying path of the poultry carcass and on opposite sides of the poultry carcass as the carrier passes along the conveying path, the pens configured to move closer to the poultry carcass to detach the residual fat on the fillet or fillets during passing of the poultry carcass, wherein the movement of the pens is caused by movement of the carrier along the conveying path.

* * * * *